3,558,194
END PLATE FOR CUTTER SHAFTS
Otto Renzing and Dieter Jahn, Bochum, Germany, assignors to Gebr. Eickhoff, Maschinenfabrik und Eisengiesserei m.b.H., Bochum, Germany
Filed June 2, 1969, Ser. No. 829,247
Claims priority, application Germany, June 1, 1968,
E 27,095
Int. Cl. E21c 25/10
U.S. Cl. 299—87                                 5 Claims

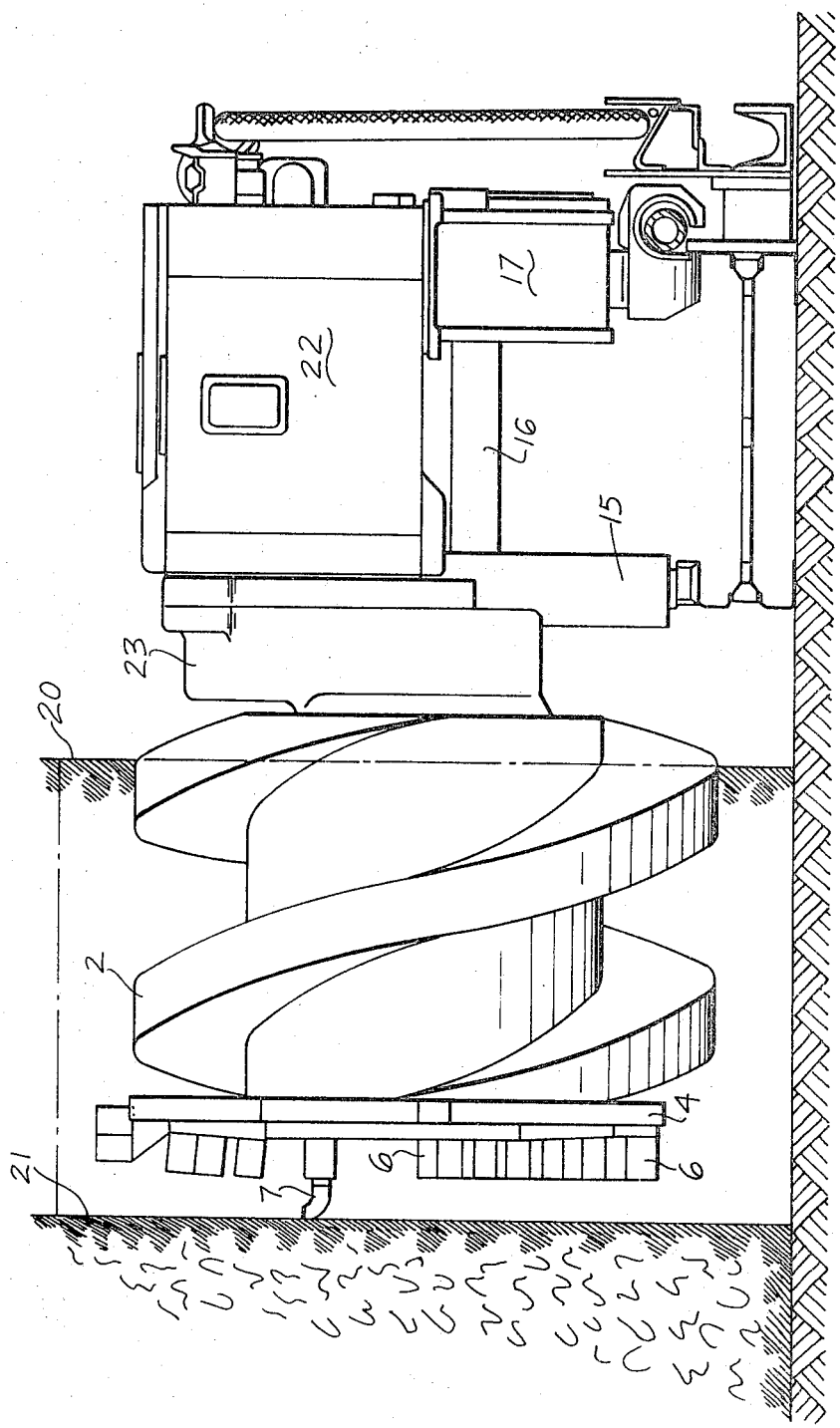

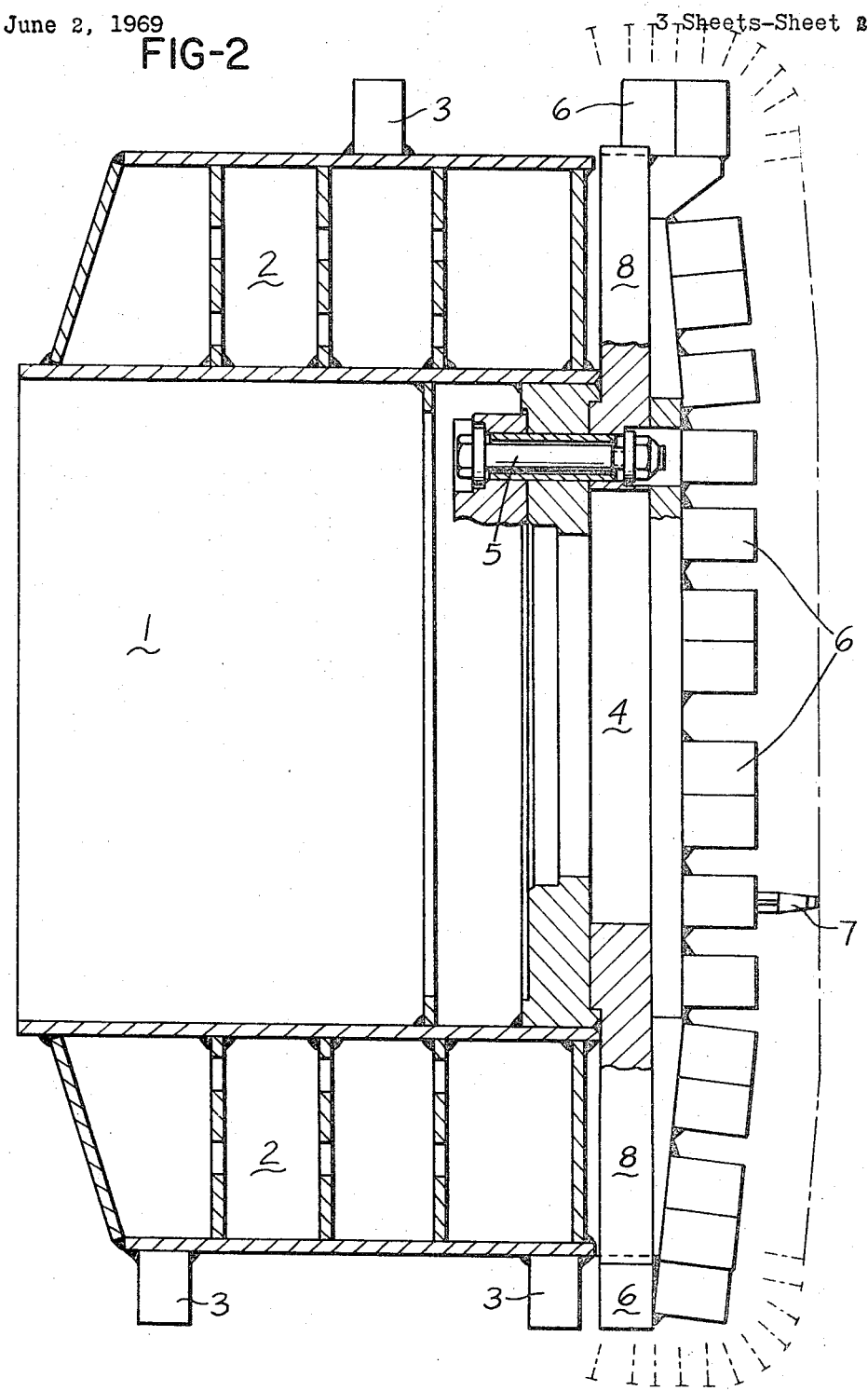

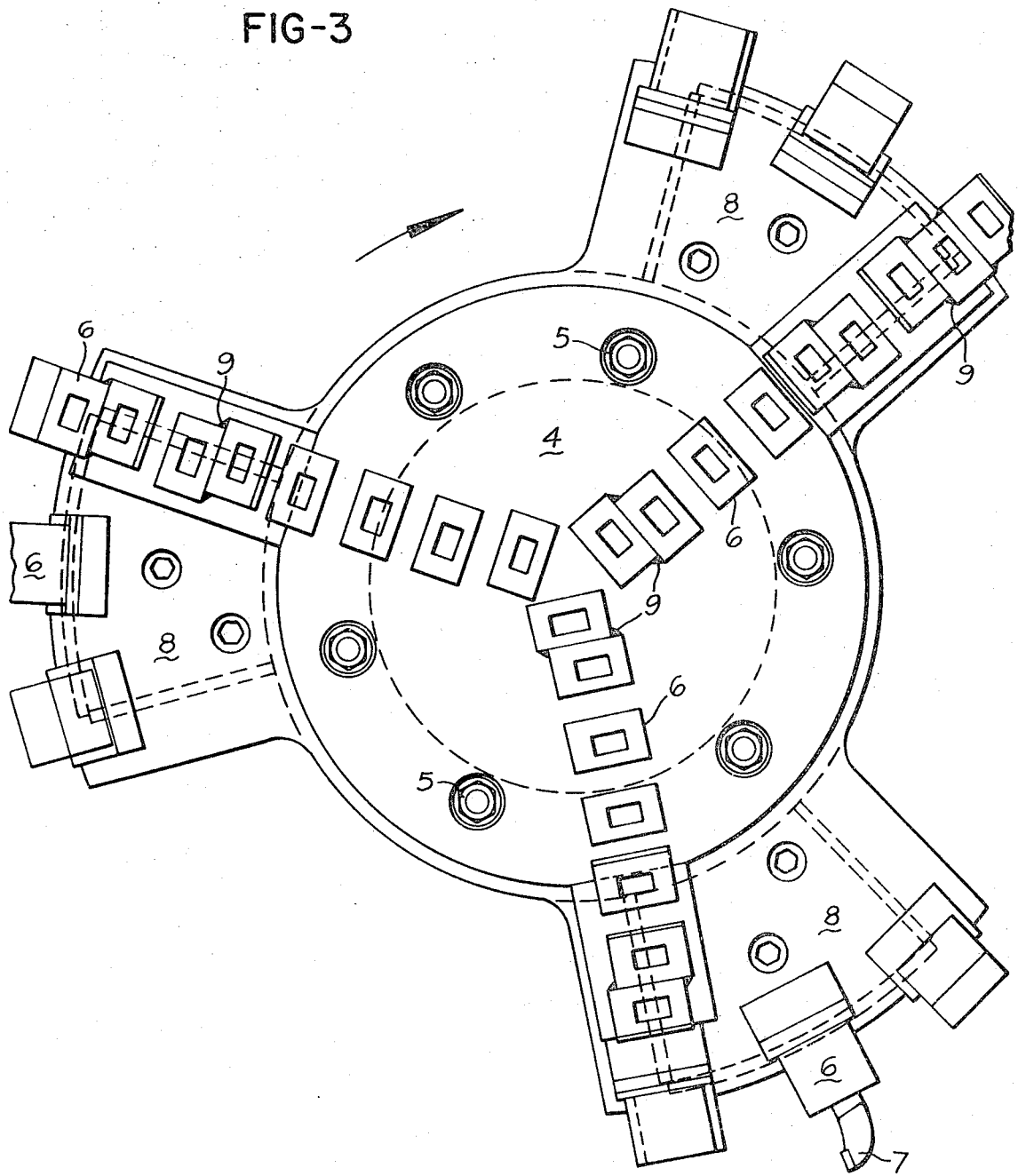

ABSTRACT OF THE DISCLOSURE

An end plate member for a cutter roller to be used in connection with mining operations which cutter roller has a basic roller body provided with helical follower strips forming helical passages therebetween, said end plate member having an outer diameter approximately equalling the diameter of said basic roller body and being equipped with a plurality of radially outwardly protruding surface sections corresponding in number to the number of said follower strips and each preferably having a shape corresponding to the shape of the end face area of a follower strip, the inner end face of said end plate member being detachably connectable to the basic roller body while the outer end face and the peripheral surface of said end plate member are equipped with tool holders for receiving and holding cutting tool means for cutting the rock or the like to be mined.

---

The present invention relates to an end plate or closure ring for cutter rollers. Cutter rollers have been known which are provided with an end plate or closure ring. Such ring is located at that end face of the roller which lies in the inner-most portion of the cut or trench and has its circumferential area equipped with closely arranged successive cutting chisel means.

Furthermore, cutting rollers have become known which have their end faces provided with a pot-shaped roller section. This pot-shaped roller section has its circumferential area as well as its end face provided with cutting chisel means. A cutting roller designed and equipped in this manner is therefore able axially to enter the face of the workings. Such roller is also able to work during a radial movement. i.e. a movement at a right angle to the axis of the roller. Since with this type of cutting rollers the chisel means at the end face of the roller is arranged on a helical surface leading into the spaces between the follower strips, it will be appreciated that when pushing the cutting roller into the face of the workings, the raw ore or the like is immediately conveyed to the follower strips and withdrawn.

Furthermore, cutting rollers have become known, the basic body of which which carries the helical follower strips, is at its end face covered by a truncated cone to the mantle surface of which extend cutting edges from the circumference of the roller which may likewise be provided with cutting chisel means. Also in this instance the surfaces starting from the cutting edges and dropping backwardly convey the loosened material to passages laterally confined by the conveyor strips.

It is an object of the present invention to provide a closure ring which will be able to take over the function of the above described roller sections.

In is another object of this invention to provide a closure ring which will enable the cutting roller not only to enter axially into the face of the workings but also to loosen the rock bed in the longitudinal direction of the face support.

These and other objects and advantages of the invention will appear more clearly from the following specification in connection with the accompanying drawings, in which:

FIG. 1 diagrammatically illustrates a cutting machine with a cutting roller having an end ring or closure ring according to the present invention.

FIG. 2 illustrates in section and on a larger scale than FIG. 1 a cutting roller provided with helical follower strips equipped with a closure ring according to the invention.

FIG. 3 illustrates a front view of the closure ring.

The present invention starts with a closure ring for cutting rollers which has its circumference and end face provided with cutting chisel means and furthermore has recesses which lead into passages located between the helical follower strips. The closure ring according to the present invention is characterized primarily in that the diameter of the closure ring is dimensioned in conformity with the diameter of the basic body of the cutting roller and is provided with radially outwardly protruding surface sections which in number correspond to the number of the follower strips and which preferably have a shape corresponding to the end faces of the follower strips and as to their surface coincide completely therewith while being located thereon.

By means of such a closure ring, a cutting roller will be able to work the rock bed in avial and radial movement of the roller. The above referred to heretofore known roller sections used for this purpose will thus become superfluous. The arrangement according to the present invention therefore has the advantage that it increases the overall length of a cutting roller only slightly and is furthermore considerably simpler in production and less expensive.

Advantageously, the surface sections of the closure ring protrude counter to the direction of rotation of the cutting roller laterally beyond the follower strips and have their circumference equipped with cutting chisel means. This design is particularly advantageous with a type of cutting rollers which has its circumference equipped with only two follower strips. In this instance there exists the possibility to increase the number of the chisel means at the end face in the circumferential area of a cutting roller and to arrange the chisel means on said surface section in a plurality of rows. The chisel holders arranged adjacent to each other at the end face may be offset with regard to each other by the thickness of the welding seams at the root portion thereof, said welding seams connecting the chisel holders to each other.

In order to use the chisel means employed during the push-in operation of the cutting roller also during the ordinary working of the rock bed for loosening the rock bed, the crest track of the cutting chisel equipment arranged on the end face may be mounted on the mantle surface of a cone which rises from the circumference of the cutting roller to the axis of the cutting roller. With such an arrangement, all cutting chisels located on the end face side will contact the rock bed to be worked and thus take part in the loosening operation while imparting a quiet running movement upon the roller. Furthermore, the axial thrust acting upon the displacement of the cutting roller shaft will be reduced.

Referring now to the drawings in detail, the cutting roller body 1 has arranged thereon follower strips 2 which extend helically around the roller body 1. Connected to said follower strips 2 are holders 3 for the cutting chisels (FIG. 2). The holders 3 receive cutting chisels (not illustrated) adapted to loosen the rock bed only during movements parallel to the face of the workings. In FIG. 1 the strips 2 have been shown without the chisel holders 3. A closure ring 4 is arranged on the front end face of the cutting roller. The ring 4 is held by screws 5 and supports the cutting chisel holders 6 on its narrow circumferential surface as well as on its end face, said holders 6 holding cutting chisels 7 (one only being shown). The holders 6 which are located in the circumferential area of the closure ring 4 support the cutting chisels at a different incline so that at this area the rock bed to be worked is loosened along the dot-dash line shown in FIG. 2 and thus a continuous transition from the circumferential cutting chisels to those arranged at the end faces will be created.

As will be seen from FIG. 3, the closure ring 4 has a diameter equalling that of the basic body 1 of the cutting roller and is provided with radially outwardly protruding surface sections 8. These surface sections 8 which together with the closure ring form a plate having a thickness of a few centimeters cover up the end faces of the follower strips 2 and in the circumferential area and also radially toward the axis of the roller carry at least one row of cutting chisel holders 6. The holders 6 at the end face are so arranged that they rotate with their cutting chisels 7 on different cutting lines respectively. Furthermore, the cutting chisels 6 arranged adjacent to each other are offset with regard to each other by the thickness of the welding seam 9 at the root portion thereof, which welding seam interconnects the chisel holders 6. Furthermore, the individual cutting chisels with the exception of those chisels located in the immediate vicinity of the cutting roller axis protrude from cutting line to cutting line further in the direction toward the face of the workings and will therefore also during the normal roller movement, in other words during the roller movement parallel to the face of the workings, take part in the loosening work.

In FIG. 1 there are illustrated an old coal face 20 and a new coal face 21. It will be appreciated from FIG. 1 that the helical follower strips 2 leave therebetween helical spaces along which the cut coal moves toward a conveyor (not shown) for withdrawing the cut coal.

The machine body 22 of the cutting machine has protruding therefrom a supporting arm 23 adapted to be pivoted about a horizontal eccentrically located axis so that the cutter roller can selectively be moved to a higher or lower position. The end of the supporting arm 23 carries the shaft rotatably supporting the cutter roller body 1.

The machine body 22 which is mounted rather high to provide therebelow the space for the passage of the cut coal, rests on a slide-like structure comprising legs 15, a transverse beam 16 and supports 17 which latter are equipped with hydraulically operable cylinders to permit moving the cutter roller into a position in which its axis is at an angle with regard to the horizontal plane.

It is, of course, to be understood that the present invention is, by no means, limited to the particular construction shown in the drawings but also comprises any modifications within the scope of the appended claims.

What we claim is:

1. An end plate member for connection to mining machinery having a basic roller body with helical follower strip means defining helical passages therebetween, said end plate member having an outer diameter approximately equalling the diameter of the basic roller body to which it is to be connected and being provided with a plurality of circumferentially spaced radially outwardly protruding surface sections corresponding in number to the number of the follower strip means of the basic roller body to which the end plate member is to be connected, said end plate member having an inner end face for detachable connection to the basic roller body of mining machinery, and tool holder means mounted on the outer end face and the peripheral surface of said end plate member for receiving and holding cutting tools for mining.

2. An end plate member according to claim 1, in which said radially protruding surface sections have a shape corresponding to and substantially co-extensive with the adjacent end faces of the helical follower strip means pertaining to the roller body to which the end plate member is to be connected.

3. An end plate member according to claim 1, in which the tool holder means on the outer end face of said end plate member are arranged in a plurality of rows, and in which at least some of the tool holder means which are adjacent to each other and pertain to one and the same row are welded to each other while being offset with regard to each other in the circumferential direction of the end plate member by a distance equalling substantially the thickness at the root portion of the respective welding seam.

4. In combination with a rotatable basic roller body of mining machinery which roller body is provided with helical follower strip means defining helical passages therebetween, an end plate member having an outer diameter approximately equalling the diameter of said basic roller body, connecting means detachably connecting said end plate member to said basic roller body, said end plate member being provided with a plurality of radially outwardly protruding surface sections corresponding in number to the number of said follower strip means, said surface sections protruding laterally beyond said follower strip means in a direction opposite to the direction of rotation of said roller body when in cutting operation, and tool holder means mounted on the outer end face and the peripheral surface of said end plate member for receiving and holding cutting tools for mining.

5. An arrangement according to claim 4, in which the path of the outermost portions of the tool holding means on the outer end face of said end plate member is defined substantially by the mantle surface of a cone passing through the circumference of the cutting roller body and co-axial therewith.

References Cited

UNITED STATES PATENTS 2,838,285 6/1958 Gredell _____ 175—413X
3,085,795 4/1963 Snipe et al. _____ 299—90X ERNEST R. PURSER, Primary Examiner U.S. Cl. X.R.

175—413; 299—91